May 24, 1932.  E. BOURQUIN  1,860,010

AUTOMATIC CHANGE SPEED MECHANISM

Filed May 2, 1931   2 Sheets-Sheet 1

May 24, 1932. E. BOURQUIN 1,860,010
AUTOMATIC CHANGE SPEED MECHANISM
Filed May 2, 1931 2 Sheets-Sheet 2

Patented May 24, 1932

1,860,010

UNITED STATES PATENT OFFICE

EDGARD BOURQUIN, OF BRY-SUR-MARNE, FRANCE

AUTOMATIC CHANGE SPEED MECHANISM

Application filed May 2, 1931, Serial No. 534,676, and in France May 7, 1930.

My invention relates to change speed mechanisms of the type which automatically adjust the cinematic connections between the driving shaft and the driven shaft in such manner that the torque of the engine may remain substantially constant whatever the variations of the resistant torque may be.

According to my invention, the driving shaft directly drives a casing carrying a plurality of couples of planet pinions, the pinions of each couple being integral with each other and being adapted to mesh respectively and with different ratios of reduction with a wheel keyed on the driven shaft and with a wheel mounted loose on said driven shaft but connected to the first mentioned wheel through a braked reversible screw gear.

Preferred embodiments of my invention will be hereinafter described with reference to the accompanying drawings, given merely by way of example, and in which.

Figure 1:
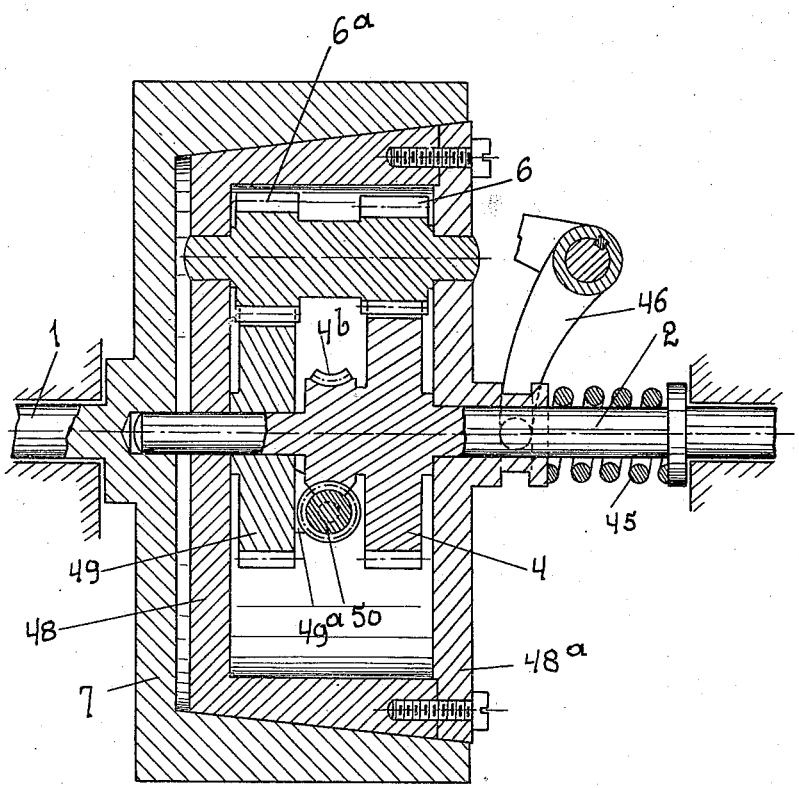
Fig. 1 is a sectional view of a first embodiment of my invention.

Adverting to Fig. 1, the change speed device according to my invention is inclosed in a fly-wheel 7 integral with driving shaft 1. A male clutch cone 48, forming a revolving casing, and closed by a plate 48a, carries two planet pinions 6 and 6a integral with one another. Said pinions have exactly the same number of teeth, but not exactly the same pitch diameter. The modules of their teeth are therefore slightly different. Pinion 6 meshes with a toothed wheel 4 integral with driven shaft 2. Another wheel 49 having one tooth less than wheel 4 meshes with pinion 6a. Said wheel 49 is mounted loose on shaft 2 and carries, through bearings 49a, a worm 50 adapted to mesh with a worm-wheel 4b. The angle of inclination of the threads of said worm should be rather small (about 6°) in order that said worm may oppose a resistance to its being rotated capable of overcoming the resistant torque corresponding to the given direct drive. When the resistant torque increases, pinions 6 and 6a are compelled to rotate about their axis so that, for an angular displacement of one turn of fly-wheel 7 and clutch cone 48 with respect to shaft 2, there is a difference of rotation of one tooth between wheels 49 and 4.

In this case the frictional losses of power (leaving aside the friction of the cylindrical gear wheels upon one another) are reduced to the product of the rotation of worm 50 and one half of the tangential force necessary for overcoming the resistant torque. The other half is furnished by pinions 6 and 6a which, in order to be able to rotate about their common axis, must overcome a resistance equal to that which is necessary for rotating worm 50, which causes them also to drive by reaction shaft 2, through wheel 4.

A spring 45, which may be compressed by acting on a clutch disengaging fork 46, applies the male clutch cone 48 against the female cone of fly-wheel 7. Said clutch disengaging fork may be actuated through a pedal or a lever in order to place the mechanism in the neutral position when the system is stopped.

A clutch cone 48, which may be made fluid-tight, may contain an oil bath for the gear wheels. Worm 50 butts against bearing 49a with a thrust that is the greater as the resistant torque is greater. It is thus braked, and the resistance it opposes to its rotation increases in direct ratio to the resistant torque of shaft 2.

I could also utilize teeth having the same module for all the gears, but in that case pinions 6 and 6a should have a difference of one tooth between them and wheels 49 and 4 should correspond. All the gears (Figs. 1 and 2) might have helicoidal teeth in order to be noiseless.

Figure 2:
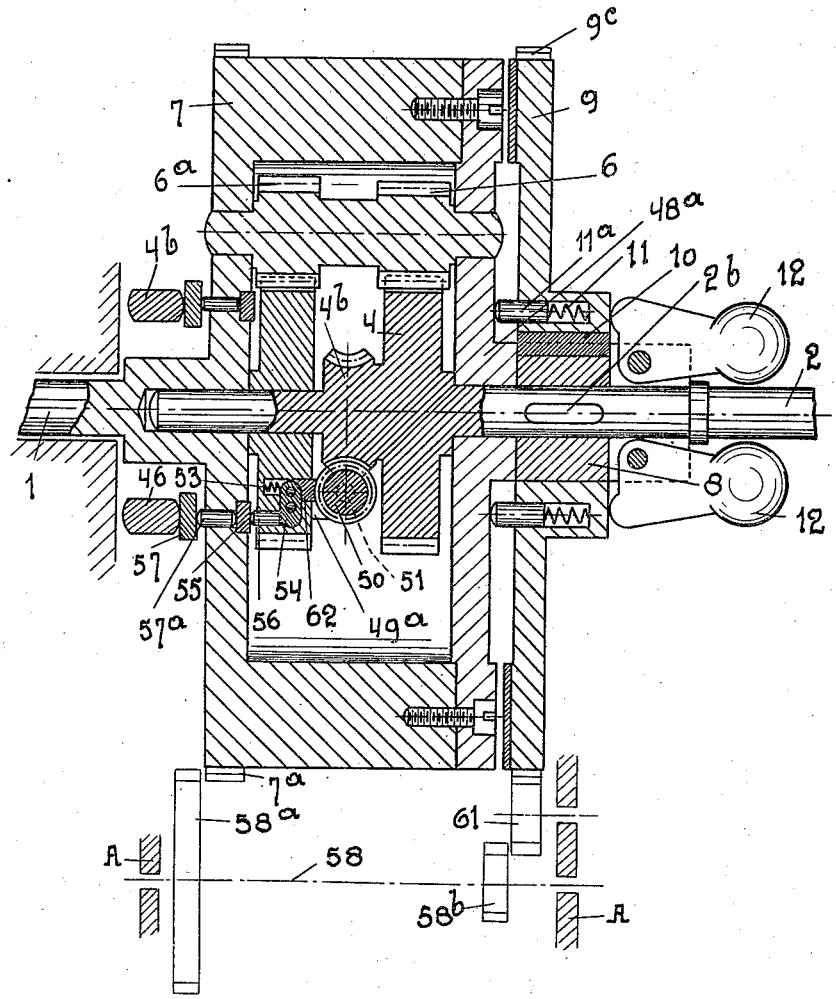
Fig. 2 is a similar view showing another embodiment.

In the embodiment shown in Fig. 2, the change-speed mechanism comprises:

(a) A direct drive through friction plate 9, automatically controlled by centrifugal weights 12 as soon as shaft 2 has a given speed of revolution. Springs 11 and fingers 11a move said friction plate away from piece 48a which serves to close fly-wheel 7. Sleeve 8 and keys 2b and 10 serve to connect friction plate 9 to shaft 2.

(b) Means for braking worm 50 which comprise a collar which is subjected to the action of a spring 53 and which may be moved away from worm 50 by a pivoting piece 54 when finger 56 is depressed through ring 55. Worm 50 has a friction coefficient which is much higher when the mechanisms driven by shaft 2 are being started than when they are running, and consequently it will be readily understood that as said worm 50 is braked it could not be set in motion, and the direct drive would always remain established if it were not possible to interrupt at will the braking of worm 50. On the other hand, when worm 50 is no longer braked, it opposes but a small resistance to its rotation, chiefly if it is provided with a thrust ball bearing. By interrupting the braking action exerted on worm 50, I therefore obtain an action analogous to the disengagement of a clutch, since the rotation of worm 50 may be accelerated to such a degree that sun wheels 4 and 49 may move angularly one with respect to the other without any effort, and that, accordingly, planet pinions 6 and 6a may roll in an epicycloidal manner about sun wheels 4 and 49 without driving them.

(c) Disengaging means, adapted to operate when a fork 46 is caused (by means of a pedal that is not shown) to act upon a ring 57 and fingers 57a. These disengaging means serve to interrupt the braking action exerted on worm 50, as above explained.

(d) A reverse gear, the drive being transmitted from fly-wheel 7 to friction plate 9 through gear wheels 7a, 58a, 58b, 61 and 9c, and shaft 58. To obtain the reverse drive, it is necessary to disconnect the above described driving mechanism and to keep it disconnected as long as the reverse gear is to be used.

While I have described what I deem to be preferred embodiments of my invention, it should be well understood that I do not wish to be limited thereto as there might be changes made in the arrangement, disposition and form of the parts without departing from the principle of my invention.

What I claim is:

1. An automatic change speed mechanism of the type described comprising in combination a driving shaft, a casing, means for directly connecting said casing to said driving shaft, two pinions, a common axis for said pinions pivoted in said casing in parallel relation to said driving shaft, a driven shaft extending into said casing in line with said driving shaft, a toothed wheel keyed on said driven shaft and adapted to mesh with one of said pinions, a toothed wheel mounted loose on said driven shaft and adapted to mesh with the other pinion, the ratios of reduction between said pinions and said wheels respectively being different, a worm wheel integral with said driven shaft, a worm, two bearings on the second named toothed wheel adapted to support said worm in tangential relation with said worm wheel, so that it can cooperate therewith, and means for braking the rotation of said worm.

2. An automatic change speed mechanism of the type described comprising in combination, a driving shaft, a fly-wheel provided with a conical recess, a casing having a conical outer surface adapted to frictionally engage said recess, means for applying said casing against said fly-wheel, two pinions, a common axis for said pinions pivoted in said casing in parallel relation to said shaft, a driven shaft extending into said casing in line with said driving shaft, a toothed wheel keyed on said driven shaft and adapted to mesh with one of said pinions, a toothed wheel mounted loose on said driven shaft and adapted to mesh with the other pinion, the ratios of reduction between said pinions and said wheels respectively being different, a worm wheel integral with said driven shaft, a worm, two bearings on the second named toothed wheel adapted to support said worm in tangential contact with said worm wheel, and means for braking the rotation of said worm.

3. An automatic change speed mechanism of the type described comprising in combination, a driving shaft, a fly-wheel provided with a conical recess, a casing having a conical outer surface adapted to frictionally engage said recess, means for applying said casing against said fly-wheel, two pinions having the same number of teeth, a common axis for said pinions pivoted in said casing in parallel relation with said shaft, a driven shaft extending into said casing in line with said driving shaft, a toothed wheel keyed on said driven shaft and adapted to mesh with one of said pinions, a toothed wheel mounted loose on said driven shaft and adapted to mesh with the other pinion and having one tooth less than said first mentioned wheel, a worm wheel integral with said driven shaft, a worm, two bearings on the second named toothed wheel adapted to support said worm in tangential contact with said worm wheel, and means for braking the rotation of said worm.

4. An automatic change speed mechanism of the type described comprising in combination, a driving shaft, a casing integral with said driving shaft, two pinions, a common axis for said pinions pivoted in said casing in parallel relation to said shaft, a driven shaft extending into said casing in line with said driving shaft, a toothed wheel keyed on said driven shaft and adapted to mesh with one of said pinions, a toothed wheel mounted loose on said driven shaft and adapted to mesh with the other pinion, the gear ratios between said pinions and said wheels respectively being different, a worm wheel integral with said driven shaft, a worm, two bearings on the second named toothed wheel adapted to support said worm in tangential contact with said worm wheel, a collar for braking the rotation of said worm, a spring for applying said collar on said worm, and means for releasing the pressure exerted by said collar on said worm.

5. An automatic change speed mechanism of the type described comprising in combination, a driving shaft, a casing integral with said driving shaft, two pinions, a common axis for said pinions pivoted in said casing in parallel relation to said shaft, a driven shaft extending into said casing in line with said driving shaft, a toothed wheel keyed on said driven shaft and adapted to mesh with one of said pinions, a toothed wheel mounted loose on said driven shaft and adapted to mesh with the other pinion, the gear ratios between said pinions and said wheels respectively being different, a worm wheel integral with said driven shaft, a worm, two bearings on the second named toothed wheel adapted to support said wheel in tangential contact with said worm wheel, a collar for braking the rotation of said worm, a spring for applying said collar on said worm, means for releasing the pressure exerted by said collar on said worm, a friction plate keyed on said driven shaft and adapted to frictionally engage the corresponding face of said casing, a centrifugal governor mounted on said driven shaft for applying said plate against said casing.

6. An automatic change speed mechanism of the type described comprising in combination a driving shaft, a frame, an epicycloidal gear having planet wheels and sun wheels the planet wheels of said gear being different in diameter and carried by said frame, a driven shaft in line with the driving shaft, one of the sun wheels being positively connected to said shaft, means for pivotally supporting the other sun wheel, a worm gear for connecting said sun wheels to one another, and means for braking the rotation of said worm gear.

7. An automatic change speed mechanism of the type described comprising in combination, a driving shaft, a casing integral with said driving shaft, two pinions, a common axis for said pinions pivoted in said casing in parallel rotation to said shaft, a driven shaft extended into said casing in line with said driving shaft, a toothed wheel keyed on said driven shaft and adapted to mesh with one of said pinions; a toothed wheel mounted loose on said driven shaft and adapted to mesh with the other pinion, the gear ratios between said pinions and said wheels respectively being different, a worm wheel integral with said driven shaft, a worm, two bearings on the second named toothed wheel adapted to support said wheel in tangential contact with said worm wheel, a collar for braking the rotation of said worm, a spring for applying said collar on said worm, means for releasing the pressure exerted by said collar on said worm, a friction plate keyed on said driven shaft and adapted to frictionally engage the corresponding face of said casing, a centrifugal governor mounted on said driven shaft for applying said plate against said casing, a toothed ring on the outer periphery of said casing, a toothed ring on the outer periphery of said friction plate, a sliding shaft parallel to said driving shaft, a gear wheel adapted to mesh with the first mentioned toothed ring, keyed to said sliding shaft, a pinion in meshing connection with said second mentioned toothed ring, and a second gear wheel adapted to mesh with said last mentioned pinion, whereby a sliding displacement of said shaft will bring said gear wheels in mesh with said first mentioned toothed ring and last mentioned pinion respectively for producing reverse gear.

In testimony whereof I have signed my name to this specification.

EDGARD BOURQUIN.